Patented Sept. 8, 1936

2,054,056

UNITED STATES PATENT OFFICE 2,054,056

AZO DYESTUFFS

Fritz Lange, Ludwigshafen-on-the-Rhine, Germany, assignor to General Aniline Works, Inc., New York, N. Y., a corporation of Delaware No Drawing. Application April 13, 1935, Serial No. 16,257. In Germany April 19, 1934

3 Claims. (Cl. 260—94)

The present invention relates to the production of azo dyestuffs.

It has already been proposed to prepare orthohydroxy azo dyestuffs containing chromium from diazotized 5-nitro-2-aminophenol and 1-naphthol-3,8-disulphonic acid or 1-naphthol-4,8-disulphonic acid. It has also been proposed to employ chromium complex compounds of the dyestuffs obtainable by coupling diazotized 5-nitro-4-chlor-2-aminophenol with 1-naphthol-4- or 5-sulphonic acid or 1-naphthol-3,6-disulphonic acid for dyeing animal fibres.

I have now found that especially valuable orthohydroxy azo dyestuffs are obtained by coupling diazotized 5-nitro-4-chlor-2-aminophenol with 1-naphthol-3,8-disulphonic acid or 1-naphthol-4,8-disulphonic acid. The azo dyestuffs thus obtainable dye animal fibres Bordeaux shades; by afterchroming, deep blue shades having very good properties as regards fastness are obtained.

The complex chromium compounds obtainable from the new azo dyestuffs by treatment with agents supplying chromium yield deep, very level navy blue dyeings having excellent fastness. As agents supplying chromium may be mentioned chromium salts of organic acids, as for example chromium salts of naphthalene sulphonic acids or chromium formate, or chromium salts of inorganic acids, as for example chromium sulphate, or mixtures of such chromium salts.

The new chromium compounds go onto the fibres in a far better manner than the known chromium compounds of the azo dyestuffs derived from diazotized 5-nitro-2-aminophenol and 1-naphthol-3,8-disulphonic acid or 1-naphthol-4,8-disulphonic acid, and yield dark shades. Furthermore they yield dyeings of purer shade and better fastness to washing. In comparison with the complex chromium compounds of the dyestuffs obtainable by coupling diazotized 5-nitro-4-chlor-2-aminophenol with 1-naphthol-4- or 5-sulphonic acid, or 1-naphthol-3,6-disulphonic acid, the new azo dyestuffs are distinguished by an especially higher levelling power.

The following examples will further illustrate how my said invention may be carried out in practice, but the invention is not restricted to these examples. The parts are by weight.

Example 1

20.3 parts of 5-nitro-4-chlor-2-aminophenol are diazotized and then coupled with 33 parts of 1-naphthol-4,8-disulphonic acid in a solution rendered alkaline with sodium carbonate. The coupling is completed within from one to two hours. The dyestuff, salted out with common salt, dyes wool Bordeaux red shades; a deep blue dyeing is obtained by afterchroming.

In order to prepare the complex chromium compound, the dyestuff is treated for about three hours at 130° C. with a solution of chromium sulphate containing 12 parts of chromium oxide. The chromium compound is salted out and yields on wool deep, very level navy blue dyeings of excellent fastness to light and good color in artificial light.

Example 2

20.3 parts of 5-nitro-4-chlor-2-aminophenol are diazotized and coupled with 33 parts of 1-naphthol-3,8-disulphonic acid in a solution rendered alkaline with sodium carbonate. The coupling is completed within quite a short time. The dyestuff, salted out with common salt, dyes wool Bordeaux red shades which are changed to dark blue by afterchroming.

In order to prepare the complex chromium compound, the dyestuff is treated for from two to three hours at 125° C. with a solution of chromium formate containing 12 parts of chromium oxide. The chromium compound separates when the chroming is completed. It yields dark greenish blue dyeings.

What I claim is:

1. Azo dyestuffs corresponding to the general formula:

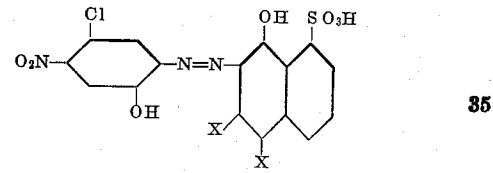

in which one X stands for the sulphonic acid group, the other X being hydrogen.

2. The azo dyestuff corresponding to the formula:

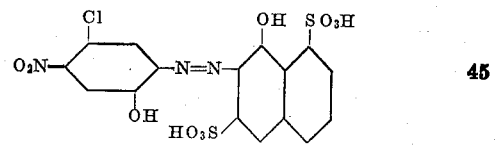

3. The azo dyestuff corresponding to the formula:

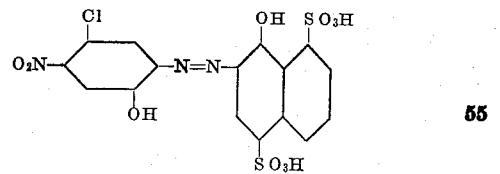

FRITZ LANGE.